(12) United States Patent
Nakagawa et al.

(10) Patent No.: US 6,576,699 B2
(45) Date of Patent: Jun. 10, 2003

(54) DAMPING RESIN COMPOSITION AND MOLDED ARTICLE USING THE SAME

(75) Inventors: Hiroyuki Nakagawa, Nakashima-gun (JP); Haruyasu Mizutani, Ama-gun (JP); Junji Koizumi, Nagoya (JP); Tomokazu Nishikawa, Nishikasugai-gun (JP); Yasunobu Teramoto, Nakashima-gun (JP); Takahiro Komori, Inazawa (JP); Yasuhide Furusawa, Nagoya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/146,100

(22) Filed: Sep. 3, 1998

(65) Prior Publication Data

US 2002/0151642 A1 Oct. 17, 2002

(30) Foreign Application Priority Data

Sep. 3, 1997 (JP) .............................. 9-255998
Sep. 24, 1997 (JP) .............................. 9-259078

(51) Int. Cl.⁷ .............................................. C08L 53/00
(52) U.S. Cl. ....................................................... 524/505
(58) Field of Search .......................................... 524/505

(56) References Cited

U.S. PATENT DOCUMENTS 4,212,787 A * 7/1980 Matsuda et al. ........... 260/33.6
4,871,796 A * 10/1989 Komatsu et al. ............. 524/474
5,081,179 A * 1/1992 Sezaki et al. ................ 524/526
5,412,024 A * 5/1995 Okada et al. ................ 524/577

FOREIGN PATENT DOCUMENTS

| EP | 0 738 756 A1 | * 10/1996 | ........... C08L/23/02 |
| JP | 2-300250 | 12/1990 | |
| JP | 4-154854 | 5/1992 | |
| JP | 4-202249 | 7/1992 | |
| JP | 5-59234 | 3/1993 | |

* cited by examiner

*Primary Examiner*—Peter D. Mulcahy
(74) *Attorney, Agent, or Firm*—Posz & Bethards, PLC

(57) ABSTRACT

A damping resin composition contains: 100 parts by weight of a polymer blend of 40 to 70% by weight of a polypropylene resin and 30 to 60% by weight of a thermoplastic elastomer; and 5 to 60 parts by weight of an inorganic filler, the thermoplastic elastomer comprising at least one member selected from the group consisting of an elastomer having a Tg of 0° C. to 20° C. and an elastomer having a Tg of −20° C. to 0° C. and an ethylene-α-olefin copolymer. Using this damping resin compostion, a vehicle rocker-panel molding, which is attached to the lower part of a vehicle side body is molded. The rocker-panel molding has a bottom section and a side section substantially perpendicular to the bottom section and having prescribed rigidity, showing a nearly L-shaped crosswise profile, in which the bottom section is thinner than the side section so that vibration energy generated on foreign matter's striking against the rocker-panel molding is forcibly converted to heat energy by the thinner bottom section thereby to suppress transmission of noise to the space of the automobile.

16 Claims, 5 Drawing Sheets

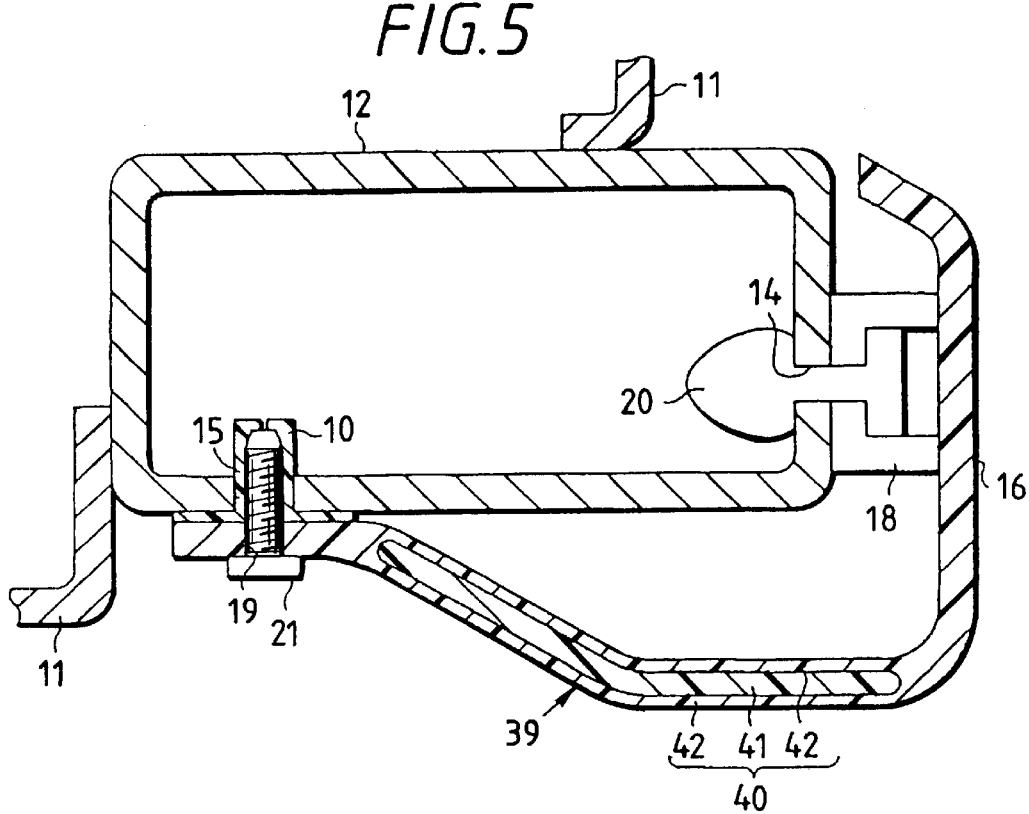
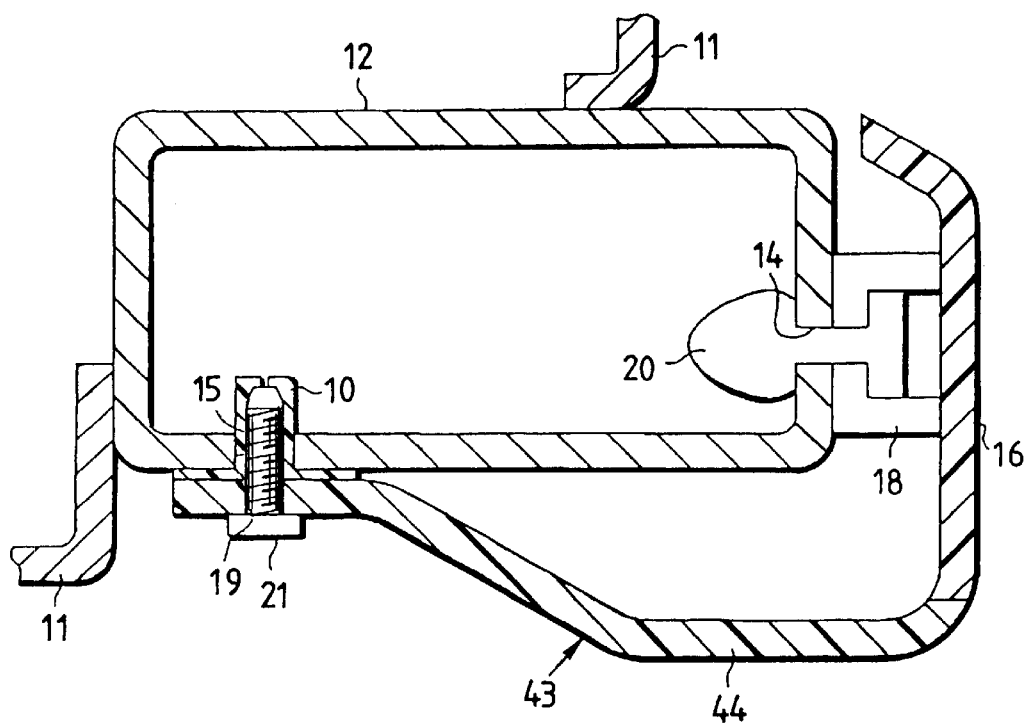

DAMPING RESIN COMPOSITION AND MOLDED ARTICLE USING THE SAME

BACKGROUND OF THE INVENTION

1. Field of the Invention

This invention relates to a vibration-damping resin composition which exhibits excellent damping properties at ambient temperature and low temperatures while having high mechanical strength, and a molded article made of such vibration-damping resin composition.

2. Description of the Related Art

In recent years, vehicle parts have been in practice changed from metallic parts to plastic parts to meet the social demand for weight reduction leading to fuel saving. Of various plastic materials, polypropylene resins have been used in large quantities in interior and exterior vehicle trim parts because of their well-balanced physical properties and relative inexpensiveness.

In particular, reinforced polypropylene resins comprising polypropylene resins loaded with inorganic fillers, such as talc, glass fiber, calcium carbonate and mixtures thereof, have high strength and heat resistance and are used in bumpers, body side moldings, dashboards, timing belt covers, blower cases, cooler housings, ducts, and the like.

In addition to weight reduction, reduction of noise of vehicles has also been demanded to improve comfort. Countermeasures against noise include vibration damping, sound insulation, vibration insulations, and sound absorption. For the noise of air conditioning equipment, different countermeasures are taken depending on whether the noise is chiefly transmitted through solid or air. Where noise is to be abated by material displacement, it is necessary to use materials having improved damping properties.

Conventional polypropylene resin compositions with improved damping properties include the one disclosed in Japanese Patent Publication No. Sho. 62-43443. The composition disclosed is still insufficient in satisfying both damping properties and mechanical strength when used in a temperature range from low temperatures to ambient temperature, e.g., from −40° C. to +40° C.

By the way, among the aforementioned exterior vehicle trim parts made of resins, there is a rocker-panel molding, which is attached to the lower side body either directly or via a rocker panel, is generally used for improvement of automobile appearance, protection of a car body from scratches or improvement of aerodynamic characteristics.

The conventional vehicle rocker-panel molding comprises a bottom section and a side section almost perpendicular to the bottom section, showing a nearly L-shaped crosswise profile. The rocker-panel molding should have rigidity to some extent because drivers or passengers may touch them on getting in or out. For the sake of convenience in molding, i.e., in order to obtain a uniform flow of a resin molding material through a mold, conventional rocker-panel moldings have a uniform thickness in the bottom section and the side section. That is, in conventional rocker-panel moldings the side section has a prescribed thickness, e.g., 3 mm, so as to secure necessary rigidity, and the bottom section has the same thickness as the side section.

When a spinning tire sends gravel or sand flying and striking against a rocker-panel molding especially the bottom section thereof, the impact generates vibration energy. Conventional rocker-panel moldings having the above-mentioned structure often have insufficient performance in reducing the vibration energy. The vibration energy produces noise (impact sound), which is transmitted from the rocker-panel molding through a rocker panel to the body, resulting in noise in the space of the car through pneumatic transmission.

SUMMARY OF THE INVENTION

An object of the present invention is to provide a damping resin composition which exhibits excellent damping properties and high mechanical strength in a low to ambient temperature range.

Another object of the present invention is to provide a rocker-panel molding which can suppress transmission of noise generated by collision of foreign matter against it into the space of the car without impairing its own function.

The present invention provides a damping resin composition comprising 100 parts by weight of a polymer blend of (A) 40 to 70% by weight of a polypropylene resin and (B) 30 to 60% by weight of a thermoplastic elastomer and 5 to 60 parts by weight of an inorganic filler, the thermoplastic elastomer (B) comprising (B1) at least one member selected from the group consisting of an elastomer having a glass transition temperature (hereinafter abbreviated as Tg) of 0° C. to 20° C. (hereinafter referred to as elastomer B11) and an elastomer having a Tg of −20° C. to 0° C. (hereinafter referred to as elastomer B12) and (B2) an ethylene-α-olefin copolymer.

What is to be noted in the present invention is as follows: A damping resin composition contains: a polymer blend comprising (A) a polypropylene resin and (B) a specific thermoplastic elastomer; and an inorganic filler at a specific mixing ratio and that the thermoplastic elastomer (B) comprises (B1) an elastomer having a specific Tg and (B2) an ethylene-α-olefin copolymer.

The polypropylene resin (A) which can be used in the present invention is preferably a crystalline polypropylene resin, including a general polypropylene resin and a modified polypropylene resin.

The general polypropylene resin includes a propylene homopolymer, a propylene-ethylene random copolymer (ethylene content: 20% by weight or less), a propylene-ethylene block copolymer (ethylene content: 20% by weight or less), and a mixture thereof. The modified polypropylene resin is a resin obtained by modifying a polypropylene resin with an unsaturated carboxylic acid or a derivative thereof in the presence of an organic peroxide.

It is preferable to use, as the crystalline polypropylene resin, a mixture of the general polypropylene resin and the modified polypropylene resin. In this case, the modified polypropylene resin is preferably used in a proportion of 1 to 20% by weight based on the total polymer blend. It is preferred for the crystalline polypropylene resin to have a melt flow index of 5 to 100. If the melt flow index is less than 5, the resin composition tends to have poor molding properties to provide molded articles with poor appearance. If it exceeds 100, the molded articles tend to have reduced impact strength.

The resin matrix (polymer blend) of the composition according to the present invention comprises 40 to 70% by weight of the polypropylene resin (A) and 30 to 60% by weight of the thermoplastic elastomer (B) hereinafter described in detail. If the proportion of the polypropylene resin is less than 40% by weight, mechanical strength is lessened. If it exceeds 70% by weight, the damping properties are reduced. If the proportion of the thermoplastic elastomer is less than 30% by weight, the damping properties are reduced. If it exceeds 60% by weight, mechanical strength is reduced.

The inorganic filler is added in an amount of 5 to 60 parts by weight per 100 parts by weight of the polymer blend. If its proportion is less than 5 parts by weight, the resin composition has insufficient mechanical strength. If it is more than 60 parts by weight, the damping properties and impact resistance are reduced.

The inorganic filler which can be used in the present invention includes talc, mica, clay, silica, alumina, calcium carbonate, magnesium carbonate, zinc oxide, titanium oxide, calcium oxide, magnesium oxide, calcium hydroxide, magnesium hydroxide, aluminum hydroxide, calcium sulfate, barium sulfate, basic magnesium sulfate, calcium silicate, glass, potassium titanate, and aluminum borate. These inorganic fillers can be in the form of fiber, whisker, flake or powder.

The thermoplastic elastomer (B) comprises an elastomer (B1) having a specific Tg and an ethylene-α-olefin copolymer (B2)

The ethylene-α-olefin copolymer (B2) includes ethylene-propylene rubber (EPM), ethylene-butadiene rubber (EBM), and ethylene-octene rubber (EOM).

The elastomer (B1) having a specific Tg is an elastomer B11 having a Tg of 0° C. to 20° C., an elastomer B12 having a Tg of −20° C. to 0° C. or a mixture of the elastomer B11 and the elastomer B12. The elastomer B11 (Tg: 0° C. to 20° C.) is particularly effective in improving the damping properties at −20° C. to 40° C. If the Tg is lower than 0° C., damping properties may tend to be insufficient in ambient temperature around 40° C. If the Tg is higher than 20° C., the damping properties of the resin composition tends to be reduced around −20° C. The elastomer B12 (Tg: −20° C. to 0° C.) is particularly effective in improving the damping properties at −40° C. to 20° C. If the Tg is lower than −20° C., the resin composition tends to have reduced damping properties in ambient temperature around 20° C. If the Tg exceeds 0° C., the damping properties may tend to be reduced in temperatures below −40° C.

The damping resin composition according to the present invention shows excellent damping performance in a low to ambient temperature range as having a damping tanδ of 0.05 or more in a temperature range of from −40° C. to 40° C. and excellent mechanical strength as having a flexural modulus of 700 MPa or more, a heat distortion temperature (HDT) of 70° C. or higher, and an Izod impact strength (at −30° C.) of 30 J/m or more as demonstrated in Examples hereinafter given.

In a preferred embodiment of the present invention, a styrene-isoprene-styrene copolymer is used as the elastomer B11 (Tg: 0° C. to 20° C.). The vinyl structure of the polyisoprene block in the styrene-isoprene-styrene copolymer can have a 1,2-vinyl bond as shown in formula (I) or a 3,4-vinyl bond as shown in formula (II).

This elastomer has rubbery elasticity as well as thermoplasticity and is compatible with various plastics.

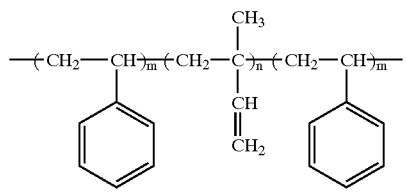

Formula (I)

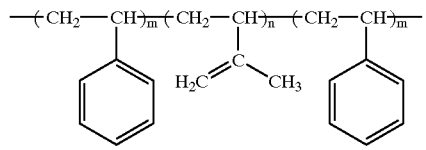

Formula (II)

In another preferred embodiment of the present invention, it is preferred to use a styrene-isoprene-styrene copolymer or polybutene-1 as the elastomer B12 (Tg: −20° C. to 0° C.) These elastomers have good compatibility with polypropylene resins.

In still another preferred embodiment, the polypropylene resin contains a modified polypropylene, modified with an unsaturated carboxylic acid or a derivative thereof. In this case, the modified polypropylene resin mediates between the polypropylene resin and the inorganic filler to improve mechanical properties such as elastic modulus, heat resistance and impact resistance. Examples of suitable unsaturated carboxylic acid or derivatives thereof are fumaric acid, citraconic acid, glutaconic acid, maleic acid, itaconic acid, maleic anhydride, glutaconic anhydride, and citraconic anhydride.

In yet another preferred embodiment of the present invention the polymer blend further comprises an oil extended ethylene-propylene-diene copolymer (EPDM). In this case, the resin composition has not only further improved damping properties but improved parting properties in molding to provide molded articles with improved appearance. The resin composition according to this embodiment is particularly effective when molded into long and narrow articles, such as bumpers, side body moldings, and rocker panel moldings.

The damping resin composition can be produced by compounding the above-described components by means of usual mixing machines, such as a single screw extruder, a twin screw extruder, a kneader, a Banbury mixer, etc. Usually, the components are mixed at a prescribed mixing ratio in a tumbling mixer, a Henschel mixer, a ribbon mixer, etc., and the resulting mixture is kneaded in an extruder, etc. and pelletized. The pellets can be molded into desired articles.

If desired, the damping resin composition can contain various additives, such as antioxidants, ultraviolet absorbers, lubricants, antistatic agents, nucleating agents, pigments, flame retarders, extenders, and processing aids.

The damping resin composition of the invention exhibits excellent damping properties particularly in a temperature range of from low temperatures to ambient temperature, e.g., from −40° C. to 40° C., and high mechanical strength. Therefore, it is useful in automotive parts and interior and exterior automotive trim parts and is effective In reducing the noise attributed to transmission of vibrations through a car body in a broad temperature range. For example, molded articles obtained from the damping resin composition of the present invention are effective in reducing transmission of noise produced when, for example, sand or gravel is sent flying and striking against the molded articles thereby to abate the noise in the space of a car.

The damping resin composition of the invention is also suitable as various fittings in factories or buildings or other electrical parts and machine parts.

Further, the above another object is accomplished by a vehicle rocker-panel molding made of the aforementioned damping resin composition, which is attached to the lower part of a vehicle side body and has a bottom section and a side section, the side section being almost perpendicular to the bottom section and possessing prescribed rigidity, wherein the bottom section has a function as an energy conversion means for forcibly converting vibration energy into heat energy.

In preferred embodiments of the present invention, the function as an energy conversion means is achieved by (1) making the bottom section thinner than the side section, (2) bonding a member to the bottom section, (3) molding the bottom section by two-layer injection molding in which the resin of the lower layer thereof is more rigid than the resin of the upper layer, (4) molding the bottom section by sandwich molding in which the resin of the skin layer is more rigid than the resin of the core layer, or (5) molding the bottom section from a resin less rigid than the resin of the side section.

According to the present invention, the resin rocker-panel molding, which is attached to the lower part of a vehicle side body, comprises at least a bottom section and a side section having prescribed rigidity, the side section being almost perpendicular to the bottom section. The bottom section has an energy conversion means which forcibly converts vibration energy generated on collision of foreign matter into heat energy. When foreign matter strikes against the bottom section to generate vibrations, the vibration energy is forcibly converted into heat energy and thus reduced sufficiently. That is, the noise (impact sound) generated by the vibration energy is abated, and the noise transmitted from the rocker-panel molding through the car body to the space in the car is lessened. Since the rocker-panel molding, especially the side section thereof, possesses prescribed rigidity, it is hardly damaged, maintaining its function, even if a stress is imposed thereon, for example, when a driver or a passenger touches on getting in or out of the car.

In the first embodiment, the function as an energy conversion means is achieved by making the bottom section thinner than the side section. Therefore, when foreign matter strikes against the bottom section, the bottom section is easily deformed by the vibration energy generated by the impact, resulting in generation of heat energy. That is, the vibration energy is forcibly converted into heat energy.

In the second embodiment, the energy conversion means is a member bonded to the bottom section. While the member is joined to the bottom section through planar contact macroscopically, the joint surface has microscopically countless points of contact. Therefore, when foreign matter strikes against the bottom section, the member bonded to the bottom section through point contact develops microscopic slide by the vibration energy. As a result of the microscopic slide between the bottom section and the bonded member, the vibration energy is forcibly converted to heat energy. Further, there is formed a microscopic layer of air between the bottom section and the bonded member. This air layer functions as a noise absorber.

According to the third embodiment, the energy conversion means is a two-layer molded bottom section comprising lower and upper layers, in which the lower layer is made of a more rigid resin material than the upper layer. When foreign matter strikes against the bottom section, the generated vibration energy, while being transmitted from the lower layer to the upper layer, is forcibly converted into heat energy mostly in the upper layer made of a relatively non-rigid resin material and is thereby reduced sufficiently. Further, since the lower layer is more rigid than the upper layer, foreign matter striking thereon is prevented from being buried into the lower layer.

According to the fourth embodiment, the energy conversion means is a sandwich-molded bottom-section comprising a skin layer and a core layer, in which the skin layer is made of a more rigid resin material than the core layer. When foreign matter strikes against the bottom section, the generated vibration energy, while being transmitted from the skin layer to the core layer, is forcibly converted into heat energy mostly in the core layer made of a relatively non-rigid resin material and is thereby reduced sufficiently. Further, since the skin layer is more rigid than the core layer, foreign matter striking thereon is prevented from being buried into the lower skin layer.

According to the fifth embodiment, the function as an energy conversion means is achieved by making the bottom section using a resin that is less rigid than the resin of the side section which should have prescribed rigidity. Therefore, when foreign matter strikes against the bottom section, the bottom section is easily deformed by the generated vibration energy, resulting in generation of heat energy. That is, the vibration energy is forcibly converted into heat energy.

BRIEF DESCRIPTION THE DRAWINGS

In the accompanying drawings:

FIG. 5 is a schematic cross section of a rocker-panel molding according to a fourth embodiment of the present invention as attached to a car body;

FIG. 6 is a schematic cross section of a rocker-panel molding according to a fifth embodiment of the present invention as attached to a car body;

DETAILED DESCRIPTION OF THE PREFERRED EMBODIMENTS

Figure 1:
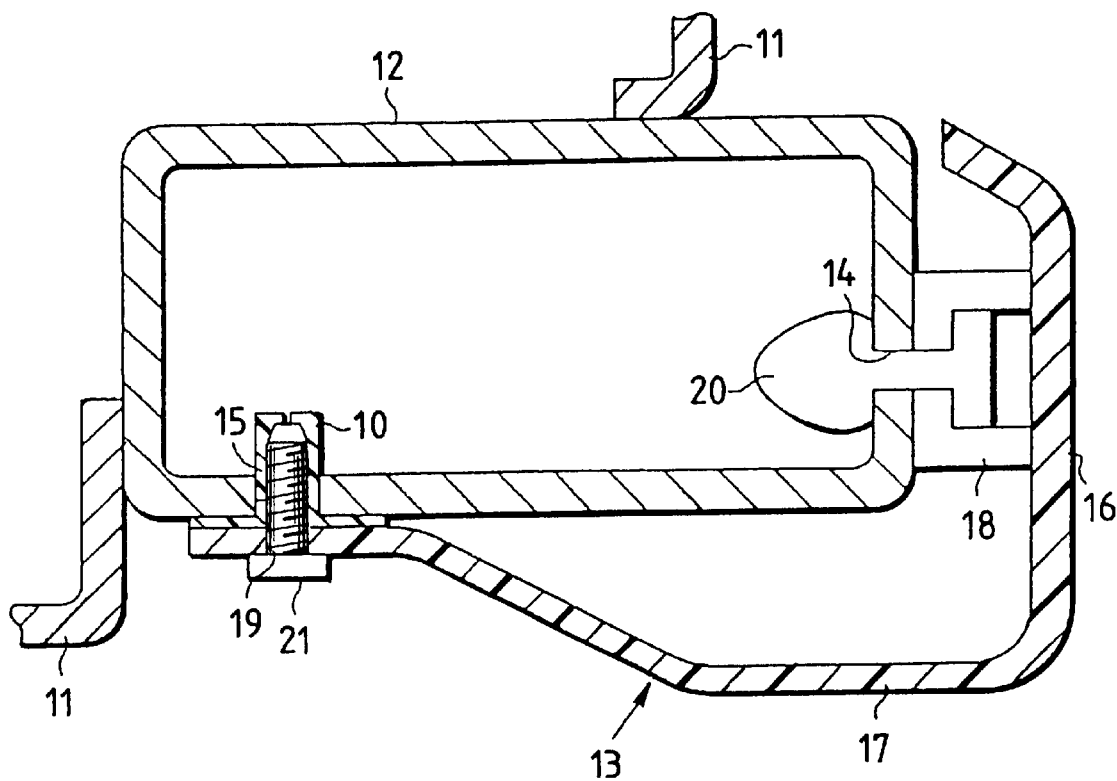
FIG. 1 is a schematic cross section of a rocker-panel molding according to a first embodiment of the present invention as attached to a car body, taken along line A—A of FIG. 2.

The present invention will now be illustrated in greater detail with reference to Examples and Comparative Examples. Various physical properties were measured in accordance with the following methods. The compounding ratios and the results of measurements on test pieces are shown in Table 1 (Examples 1 to 10) and Table 2 (Comparative Examples 1 to 5). In Tables, "polypropylene resin" is a propylene-ethylene block copolymer having a melt flow index of 65, and "modified polypropylene resin" is a maleic anhydride-modified polypropylene resin. "V-SIS" means a styrene-isoprene-styrene copolymer having a polyisoprene block having a vinyl structure as a thermoplastic elastomer. "PB-1" means polybutene-1. "Tg" stands for a glass transition temperature. "EPM" stands for an ethylene-α-propylene copolymer as an ethylene-α-olefin copolymer. "Oil extended EPDM" is EPDM containing 40% by weight of process oil. "Inorganic filler" is talc having an average particle size of 20 μm. The amounts of resinous components are expressed in percent by weight based on the total polymer blend, and the amount of the inorganic filler is expressed in part by weight per 100 parts by weight of the total polymer blend.

Measurement of Physical Properties a) Flexural modulus (MPa)

Measured in accordance with ASTM D790.

b) Izod impact strength (J/m)

Measured at −30° C. in accordance with ASTM D256.

c) Heat distortion temperature (HDT) (□C)

Measured under a load of 4.6 kg/cm² in accordance with ASTM D648.

d) Damping tanδ

A test piece of 30 mm in length, 5 mm in width and 2 mm in thickness was prepared by injection molding. The test specimen was placed in a thermostat controllable from −100° C. to +100° C. A sine wave of 20 Hz was applied to the test piece, and the response to the stress was detected, from which peaks in a temperature range of from −40° C. to 0° C. and of from 0° C. to 40° C. were obtained by calculations based on the linear viscoelasticity theory.

e) Appearance of molded articles

The appearance of an injection molded test piece produced by use of an 80 t injection molding machine was evaluated by observing surface delamination, voids, etc. with the naked eye and rated on a scale of A (excellent) to D (poor).

Each of the resin compositions shown in Tables 1 and 2 was melt-kneaded in a twin-screw bidirectional extruder having a length of 27 mm and a diameter of 30 mm and pelletized. The pellets were dried at 80° C. for 3 hours and molded in an 80 t injection molding machine to prepare test pieces.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Composition: | | | | | | | | | | |
| Polypropylene Resin | 53 | 66 | 42 | 53 | 53 | 53 | 53 | 53 | 47 | 47 |
| Modified Polypropylene Resin | | | | | | | | | 6 | 6 |
| V-SIS (Tg: 8° C.) | 17 | 17 | 29 | 17 | 17 | | 8.5 | 8.5 | 8.5 | 8.5 |
| V-SIS (Tg: −17° C.) | | | | | | 17 | 8.5 | | 8.5 | 8.5 |
| PB-1 (Tg: −20° C.) | | | | | | | | 8.5 | | |
| EPM | 30 | 17 | 29 | 30 | 30 | 30 | 30 | 30 | 30 | 18 |
| Oil Extended EPDM | | | | | | | | | | 12 |
| Inorganic Filler | 18 | 18 | 18 | 55 | 7 | 18 | 18 | 18 | 18 | 18 |
| Flexural Modulus (MPa) | 870 | 960 | 740 | 2500 | 710 | 824 | 845 | 906 | 967 | 871 |
| HDT (° C.) | 78 | 98 | 72 | 124 | 83 | 77 | 78 | 80 | 100 | 109 |
| Izod Impact Strength (J/m) | 45 | 38 | 55 | 35 | 50 | 47 | 45 | 51 | 53 | 51 |
| Damping tanδ −40° C. to 0° C. | 61 | 60 | 78 | 55 | 63 | 126 | 83 | 77 | 105 | 117 |
| (×10⁻³) 0° C. to 40° C. | 142 | 146 | 152 | 120 | 147 | 63 | 87 | 93 | 120 | 123 |
| Appearance | B | B | B | B | B | B | B | B | B | A |

TABLE 2

| | Comparative Example No. | | | | |
|---|---|---|---|---|---|
| | 1 | 2 | 3 | 4 | 5 |
| Composition: | | | | | |
| Polypropylene Resin | 30 | 80 | 53 | 53 | 47 |
| Modified Polypropylene Resin | | | | | 6 |
| V-SIS (Tg: 8° C.) | 26 | 10 | 17 | 17 | 17 |
| V-SIS (Tg: −17° C.) | | | | | |
| PB-1 (Tg: −20° C.) | | | | | |
| EPM | 44 | 10 | 30 | 30 | 30 |
| Oil Extended EPDM | | | | | |
| Inorganic Filler | 18 | 18 | | 70 | |
| Flexural Modulus (MPa) | 570 | 1105 | 450 | 2800 | 513 |
| HDT (° C.) | 62 | 102 | 81 | 130 | 94 |
| Izod Impact Strength (J/m) | 75 | 27 | 50 | 28 | 56 |
| Damping −40° C. to 0° C. | 80 | 37 | 65 | 52 | 70 |
| tanδ (×10⁻³) 0° C. to 40° C. | 155 | 87 | 146 | 110 | 130 |
| Appearance | D | B | C | C | C |

In the above evaluation, the desired levels of damping properties and mechanical properties are 0.05 or more as for damping tanδ, 700 MPa or higher as for flexural modulus, 70□C or higher as for HDT, and 30 J/m or higher as to Izod impact strength (at −30□C).

It can be seen from Table 1 that Examples 1 to 10 each exhibit high damping properties (damping tanδ), high mechanical strength, and satisfactory appearance. In particular, Examples 7 to 8, in which an elastomer having a Tg of −20° C. to 0° C. and an elastomer having a Tg of 0° C. to 20° C. are used in combination, show high damping performance in both the temperature ranges of from −40° C. to 0° C. and of from 0° C. to 40° C. Examples 9 to 10, wherein a modified polypropylene resin is used as part of a polypropylene resin (A), exhibit further improved mechanical properties and damping performance. Example 10 containing oil extended EPDM achieves especially improved damping performance and improved molding properties.

On the other hand, Comparative Examples 1 to 5 do not reach all the desired levels of the damping properties and mechanical properties because of shortage of the polypropylene resin (Comparative Example 1), shortage of the thermoplastic elastomer (Comparative Example 2), lack of the inorganic filler (Comparative Examples 3 and 5) or excess of the inorganic filler (Comparative Example 4).

Figure 2:
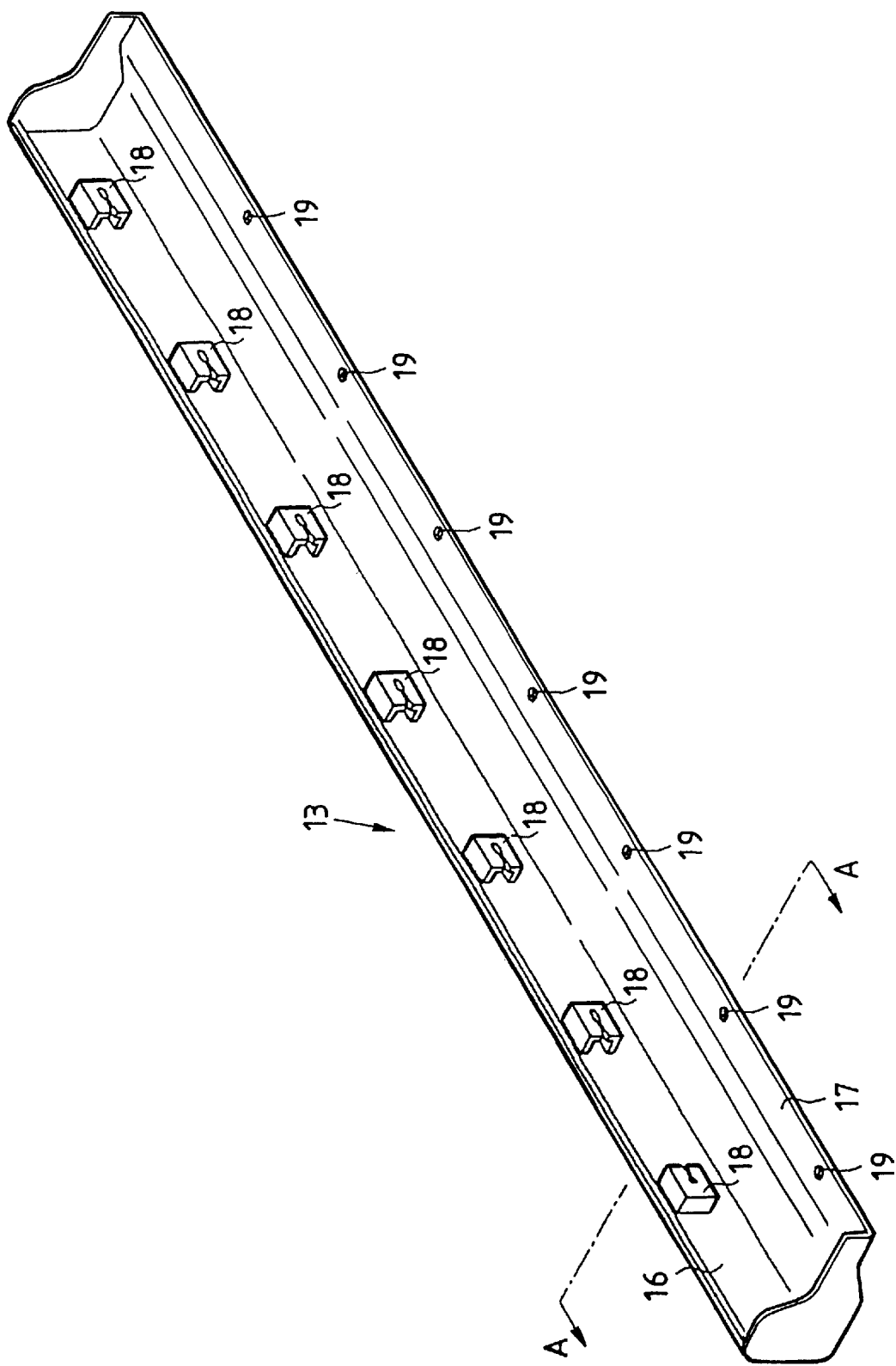
FIG. 2 is a perspective view of the rocker-panel molding of FIG. 1.

Next, a first embodiment of a rocker panel molding as a molded article will be illustrated by referring to FIGS. 1 and 2. The rocker panel molding can be made using the aforementioned damping resin composition.

As shown in FIG. 1, a rocker panel 12 having a rectangular cross section is attached to the lower part of a side body 11 of an automobile, and a rocker-panel molding 13 is attached to the rocker panel 12. The rocker panel 12 has a plurality of through-holes 14 at regular intervals in its side and a plurality of through-holes 15 at regular intervals in the bottom.

As shown in FIG. 2, the rocker-panel molding 13 has a side section 16 and a bottom section 17 which is substantially perpendicular to the side section 16, forming an L-shaped crosswise profile. The rocker-panel molding 13 is made of the aforementioned damping resin composition. The side section 16 of the rocker-panel molding 13 has on its inner surface a plurality of clip seats 18 arranged in the longitudinal direction thereof at positions corresponding to the through-holes 14 of the rocker panel 12. The bottom section 17 has a plurality of through-holes 19 in the longitudinal direction thereof at positions corresponding to the through-holes 15 of the rocker panel 12.

In the example shown in FIG. 2, the positions of the clip seats 18 and those of the through-holes 19 are not on the same cross-section so as to facilitate mounting of the rocker-panel molding 13 onto the rocker panel 12. The side section 16, the bottom section 17, and the clip seats 18 are integrally molded by known injection molding.

As shown in FIG. 1, the rocker-panel molding 13 with clips 20 each previously fitted into the clip seats 18 and grommets 10 each previously fitted into the through-holes 15 is mounted on the side and bottom of the rocker panel 12 by inserting the clips 20 into the corresponding through-holes 14 of the rocker panel 12 and sinking self-tapping screws 21 through the through-holes 19 and the grommets 10.

The first embodiment shown in FIGS. 1 and 2 is characterized in that the side section 16 has a prescribed thickness enough to secure prescribed rigidity (e.g., 3 mm) and that the bottom section 17 is thinner than the side section 16 (e.g., 2 mm). Therefore, when foreign matter, such as gravel or sand, strikes against the bottom section 17 to generate vibration energy, the thin bottom section 17 is easily deformed by the vibration energy. The deformation of the bottom section 17 is accompanied by generation of heat energy. That is, the vibration energy is reduced by forcible conversion into heat energy whereby noise made by the vibration energy is reduced, which leads to reduction of noise transmission to the space in the car. Since the side section 16 of the rocker-panel molding 13 possesses prescribed rigidity owing to its thickness, it is hardly damaged, maintaining its function, even if a stress is imposed thereon, for example, when a driver, etc. touches it on getting in or out of the car.

Figure 3:
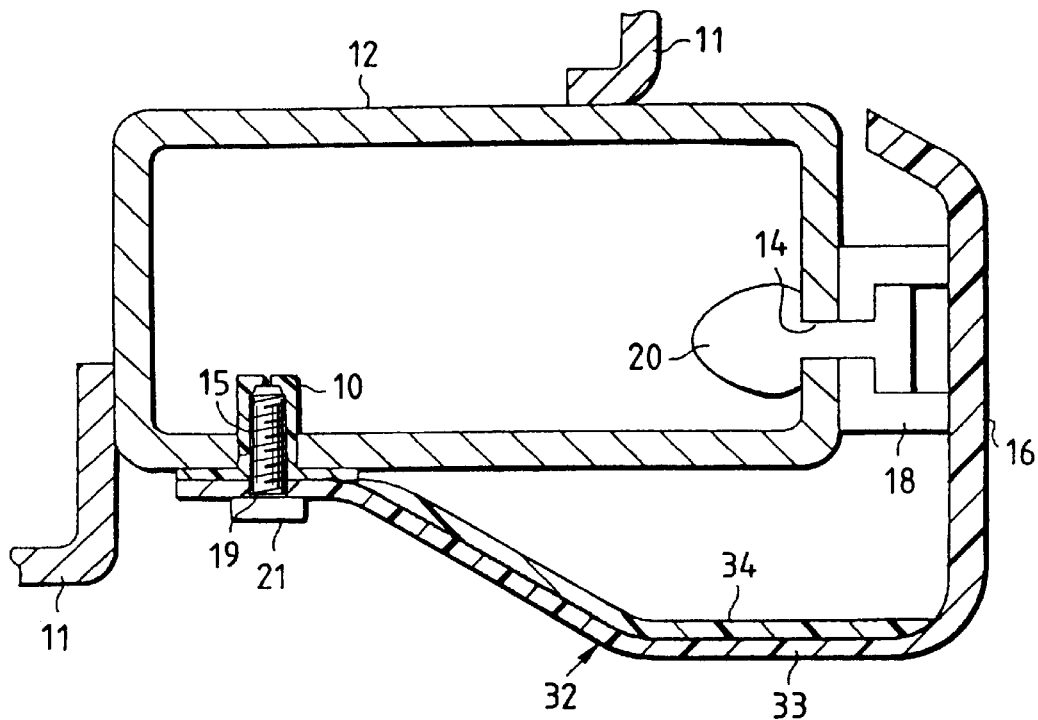
FIG. 3 is a schematic cross section of a rocker-panel molding according to a second embodiment of the present invention as attached to a car body.

A second embodiment of the rocker-panel molding will be described chiefly by referring to differences from the first embodiment. FIG. 3 is referred to, wherein members equivalent to those used in the first embodiment, which are not particularly described, are given the same reference numbers as in FIG. 1.

As shown in FIG. 3, the difference of a rocker-panel molding 32 from the first embodiment lies in the structure of a bottom section 33. The bottom section 33 of the second embodiment has a bonded member 34 bonded to the inner side thereof by, for example, heat fusion. In more detail; the side section 16 of the rocker-panel molding 32 has a thickness of 3 mm similarly to the first embodiment, whereas the bottom section 33 and the bonded member 34 each have a thickness of 1.5 mm. The bonded member 34 is molded from a resin material such as polypropylene (PP) Further, the bonded member 34 can be molded from the aforementioned damping resin composition which is different in mixing ratio from the damping resin composition of the bottom section 33 and the side section 16.

While the bonded member 34 is joined to the bottom section 33 through planar contact macroscopically, the joint surface has microscopically countless points of contact. Therefore, when foreign matter strikes against the bottom section 33, the bonded member 34 bonded to the bottom section 33 through point contact develops microscopic slide by the vibration energy. As a result of the microscopic slide between the bottom section 33 and the bonded member 34, the vibration energy is forcibly converted to heat energy. The vibration energy can thus be reduced sufficiently, and the noise caused by the vibration energy can be suppressed, leading to suppression of noise transmission to the car space.

In addition, there is formed a microscopic layer of air between the bottom section 33 and the bonded member 34. This air layer functions as a noise absorber, which further assures suppression of noise transmission to the car space.

Figure 4:
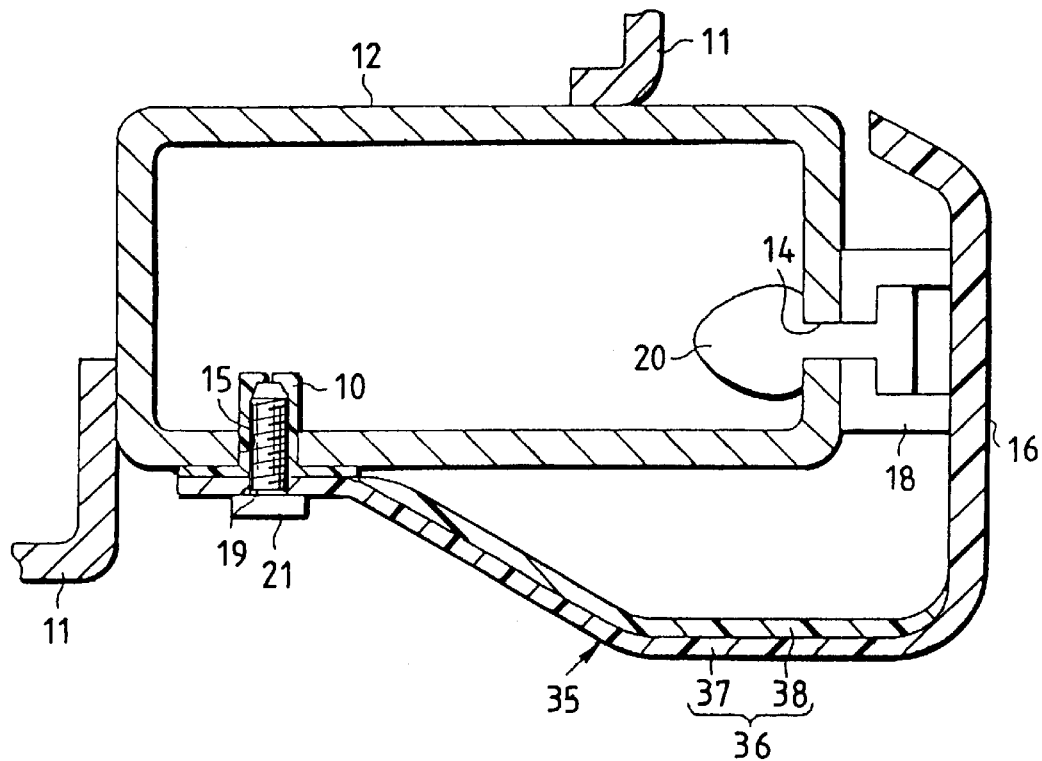
FIG. 4 is a schematic cross section of a rocker-panel molding according to a third embodiment of the present invention as attached to a car body.

A third embodiment of the rocker-panel molding is explained with reference to FIG. 4. The difference from the first embodiment resides in that a bottom section 36 of a rocker-panel molding 35 comprises a lower resin layer 37 (first resin layer) and an upper resin layer 38 (second resin layer). The side section 15, the lower resin layer 37 and the upper resin layer 38 are made of the aforementioned damping resin composition. In greater detail, the side section 16 of the rocker-panel molding 35 has a thickness of 3 mm similarly to the first embodiment, whereas the lower resin layer 37 and the upper resin layer 38 each have a thickness of 1.5 mm. The lower resin layer 37 is made of the same relatively rigid material as used for the side section 16, while the upper resin layer 38 is made of a resin material less rigid than the resin material used for the upper resin layer 37.

The rocker-panel molding 35 can be produced by known two-layer injection molding. That is, the lower resin layer 37 and the side section 16 are prepared by integral molding of a relatively rigid resin molding material by use of a mold having a slide core. Then the slide core is slid to furnish the cavity for the upper resin layer 38, and a relatively non-rigid resin material is injected into the cavity to form the upper resin layer 38, followed by opening and removal from the mold.

The third embodiment is characterized by the two-layer molded bottom section 36, in which the lower resin layer 37 is more rigid than the upper resin layer 38. When foreign matter such as gravel or sand strikes against the bottom section 36, the generated vibration energy, while being transmitted from the lower resin layer 37 to the upper resin layer 38, is forcibly converted into heat energy mostly in the upper resin layer 38 made of a relatively non-rigid resin material and is thereby reduced sufficiently. As a result, the noise generated by the vibration energy can be suppressed, which leads to suppression of noise transmission to the car space.

Further, since the lower resin layer 37 is more rigid than the upper resin layer 38, gravel or sand striking against the bottom section 36 is prevented from being buried into the lower resin layer 37.

A fourth embodiment of the rocker-panel molding is described by referring to FIG. 5. The difference from the first embodiment consists in that a bottom section 40 of a rocker-panel molding 39 is molded by known sandwich molding. More specifically, the bottom section 40 comprises a core layer 41 and a skin layer 42 enveloping the core layer 41, in which the skin layer 42 is made of a more rigid material than the core layer 41. The side section 16 of the rocker-panel molding 39 has a thickness of 3 mm similarly to the first embodiment, whereas the upper and lower skin layers 42 each have a thickness of 1 mm, and the core layer 41 has a thickness of 2 mm. The skin layer 42 and the side section 16 are made of the same material.

According to the fourth embodiment, when gravel or sand strikes against the bottom section, the generated vibration energy, while being transmitted from the skin layer 42 to the core layer 41, is forcibly converted into heat energy mostly in the core layer 41 made of a relatively non-rigid resin material and is thereby reduced sufficiently. As a result, the noise generated by the vibration energy can be suppressed, which leads to suppression of the noise transmission to the space of the car.

Further, since the skin layer 42 is more rigid than the core layer 41, gravel or sand striking thereagainst is prevented from being buried into the lower skin layer 42.

A fifth embodiment of the rocker-panel molding is illustrated in FIG. 6. This embodiment is characterized in that a bottom section 44 of a rocker-panel molding 43 is made of a less rigid material than the side section 16 having prescribed rigidity. More specifically, the bottom section 44 and the side section 16 are integrally molded from the respective resin molding materials by two-layer molding. In the embodiment shown in FIG. 6 the side section 16 and the bottom section 44 have the same thickness (e.g., 3 mm).

Since the bottom section 44 is made of a less rigid resin than the side section 16, the bottom 44 is easily deformed by vibration energy generated by the impact of foreign matter's striking against the bottom section 44. The deformation of the bottom section 44 generates heat energy, namely, the vibration energy is forcibly converted to heat energy to sufficiently reduce the vibration energy. As a result, the noise generated by the vibration energy can be suppressed, which leads to suppression of noise transmission to the car space.

While the present invention has been described with reference to its preferred embodiments, the present invention is not limited thereto, and the following modifications can be made therein without departing from the spirit and scope of the present invention.

Figure 7:
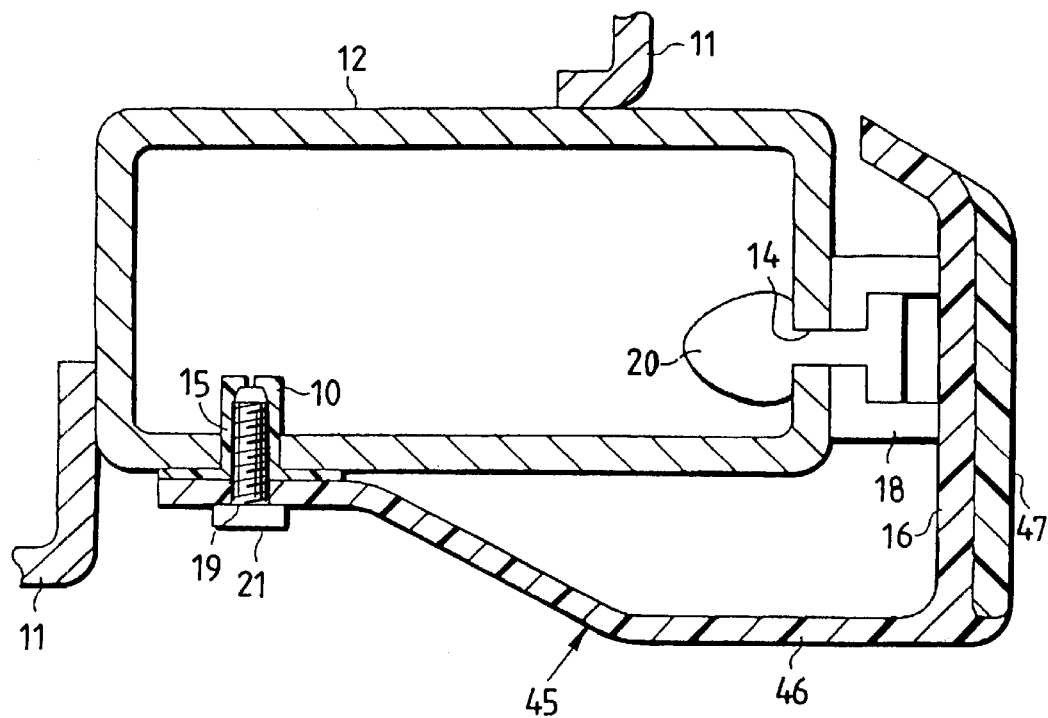
FIG. 7 is a schematic cross section of a rocker-panel molding according to a modification of the first embodiment of the present invention, as attached to a car body.
Figure 8:
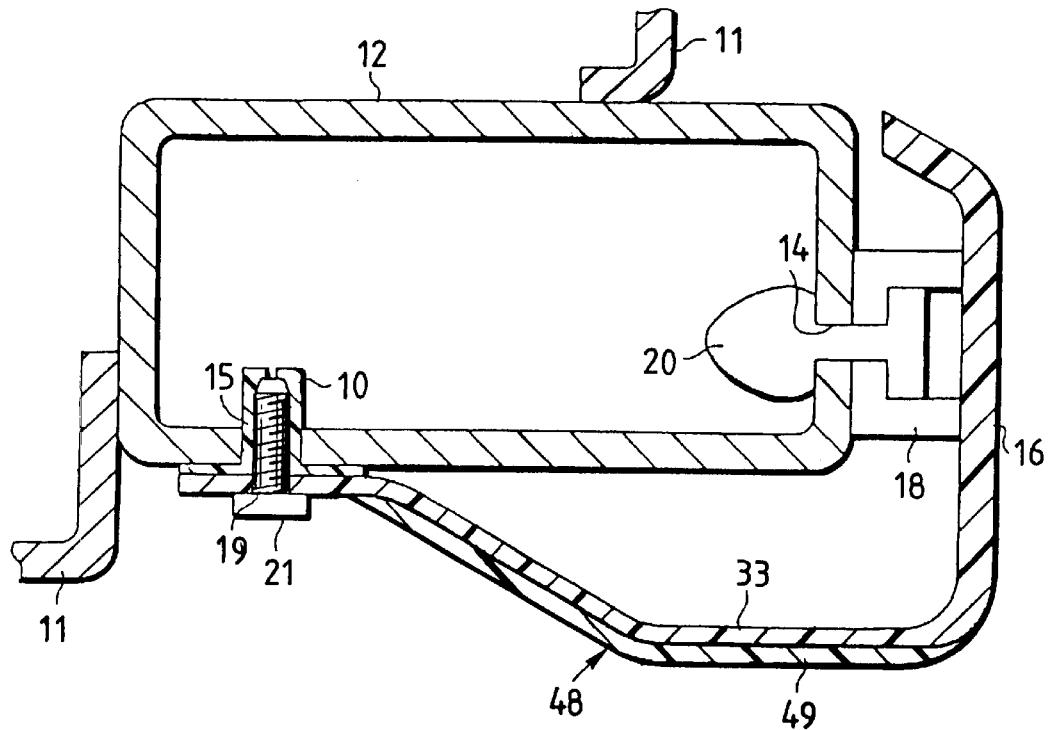
FIG. 8 is a schematic cross section of a rocker-panel molding according to a modification of the second embodiment of the present invention as attached to a car body.

The first embodiment, characterized in that the bottom section 17 is thinner than the side section 16, can be modified as shown in FIG. 7, in which a bottom section 46 of the rocker-panel molding 13 is extended over the intersection with the side section 16, and another side section 47 made of a resin material is formed on the outer side of the side section 16. The bottom section 46 is thinner than the total thickness of the side sections 16 and 47. In addition, the bottom section 46 and the side section 16 can be made of a less rigid material than the side section 47.

The second embodiment, in which the bonded member 34 is bonded to the inner surface of the bottom section 33 by heat fusion, can be modified as shown in FIG. 11, wherein a bonded member 49 is bonded to the outer surface of the bottom section 33. In this case, the bonded member 49 may be made of less rigid material than the bottom section 33 and the side section 16. Further, the bonded member 34 or 49 can be bonded to the bottom section 33 via an adhesive or a double-sided adhesive tape instead of heat fusion bonding. Furthermore, the member 34 or 49 is not particularly limited in material. That is, it may be made of the damping resin composition according to the present invention, other resin materials, a rubber material and the like.

While in the embodiments shown in the drawings the rocker-panel molding 13, 32, 35, 39 or 43 is attached to the lower part of the side body 11 via the rocker panel 12, it can be attached directly to the lower part of the side body 11.

The first embodiment and the fifth embodiment can be combined. In this modification there is produced a synergistic effect in suppressing the noise transmission to the car space.

Additionally, in the fifth embodiment, the bottom section 44 and the side section 16 can be molded separately and joined together via an adhesive or by heat fusion.

As aforementioned, the damping resin composition according to the present invention exhibits excellent vibration-damping properties and high mechanical strength even at low temperatures as well as ambient temperature.

Further, the vehicle rocker-panel molding according to the present invention exhibits an excellent effect in suppressing transmission of noise generated on foreign matter's striking there against to the space of a car while retaining its essential function.

What is claimed is:

1. A damping resin composition, comprising:
   100 parts by weight of a polymer blend of 40 to 70% by weight of a polypropylene resin and 30 to 60% by weight of a thermoplastic elastomer; and
   5 to 60 parts by weight of an inorganic filler,
   wherein the thermoplastic elastomer comprises:
      a first styrene-isoprene-styrene elastomeric copolymer having a glass transition temperature of 0° C. to 20° C., the polyisoprene blocks of said first copolymer having a vinyl structure, and
      a second styrene-isoprene-styrene elastomeric copolymer having a glass transition temperature of −20° C. to 0° C., the polyisoprene blocks of said second copolymer having a vinyl structure; and
      an ethylene-α-olefin elastomer;
      wherein said damping resin composition has a damping tanδ of 0.05 or more in a temperature range of from −40° C. to 40° C. and an Izod impact strength of 30 J/m or more under −30° C.

2. The damping resin composition according to claim 1, wherein said polypropylene resin contains a modified polypropylene resin modified with an unsaturated carboxylic acid or a derivative thereof.

3. The damping resin composition according to claim 1, wherein said polymer blend contains oil extended ethylene-propylene-diene copolymer.

4. The damping resin composition according to claim 1, wherein said inorganic filler comprises at least one member selected from the group consisting of talc, mica, clay, silica, alumina, calcium carbonate, magnesium carbonate, zinc oxide, titanium oxide, calcium oxide, magnesium oxide, calcium hydroxide, magnesium hydroxide, aluminum hydroxide, calcium sulfate, barium sulfate, basic magnesium sulfate, calcium silicate, glass, potassium titanate, and aluminum borate.

5. The damping resin composition according to claim 1, wherein said ethylene-α-olefin elastomer comprises at least one member selected from the group consisting of ethylene-propylene rubber, ethylene-butadiene rubber, and ethylene-octene rubber.

6. The damping resin composition according to claim 1, wherein said polypropylene resin comprises a crystalline polypropylene resin.

7. The damping resin composition according to claim 6, wherein a melt flow index of said crystalline polypropylene resin is in a range of 5 to 100.

8. A rocker-panel molding comprising said damping resin composition according to claim 1, said rocker-panel being attached to a lower part of a vehicle side body, and comprising:

a bottom section; and a side section being substantially perpendicular to said bottom section and possessing a prescribed rigidity, wherein said bottom section forcibly converts vibration energy generated on collision of foreign matter into heat energy.

9. The rocker-panel molding according to claim 8, wherein said bottom section is thinner than said side section.

10. The rocker-panel molding according to claim 8, further comprising a bonded member bonded to said bottom section.

11. The rocker-panel molding according to claim 8, wherein said bottom section is molded by two-layer injection molding in which said damping resin composition of a lower layer is more rigid than the composition of an upper layer.

12. The rocker-panel molding according to claim 8, wherein said bottom section is molded by sandwich molding in which said damping composition of a skin layer is more rigid than the composition of a core layer.

13. The rocker-panel molding according to claim 8, wherein said bottom section is molded from a resin less rigid than resin of said side section.

14. The damping resin composition of claim 1, wherein one of said elastomers having the glass transition temperature of either 0° C. to 20° C. or −20° C. to 0° C. is a styrene-isoprene-styrene copolymer with polyisoprene blocks having a vinyl structure with a 1,2-vinyl bond.

15. The damping resin composition of claim 1, wherein one of said elastomers having the glass transition temperature of either 0° C. to 20° C. or −20° C. to 0° C. is a styrene-isoprene-styrene copolymer with polyisoprene blocks having a vinyl structure with a 3,4-vinyl bond.

16. A damping resin composition, comprising:

100 parts by weight of a polymer blend of 40 to 70% by weight polypropylene resin and 30 to 60% by weight of a thermoplastic elastomer, the thermoplastic elastomer including a first styrene-isoprene-styrene elastomeric copolymer having a glass transition temperature of 0° C. to 20° C., the polyisoprene blocks of said first copolymer having a vinyl structure, a second styrene-isoprene-styrene elastomeric copolymer having a glass transition temperature of −20° C. to 0° C., the polyisoprene blocks of said second copolymer having a vinyl structure, and an ethylene-α-olefin elastomer; and 5 to 60 parts by weight of an inorganic filler.

* * * * *